W. W. SANBORN.

Churn.

No. 65,014. Patented May 21, 1867.

Witnesses:
B. B. Hart
Geo. W. Paster

Inventor:
W. W. Sanborn

United States Patent Office.

WILLIAM W. SANBORN, OF LYONS CITY, IOWA.

Letters Patent No. 65,014, dated May 21, 1867.

CHURN.

*The Schedule referred to in these Letters Patent and making part of the same.*

TO ALL WHOM IT MAY CONCERN:

Be it known that I, WILLIAM W. SANBORN, of Lyons City, Clinton county, State of Iowa, have invented a new and useful improvement in Dairy Churns; and I do hereby declare that the following is a full, clear, and exact description of the construction and operation of the same, reference being had to the annexed drawings, and letters of reference marked thereon, all making a part of this specification, in which—

Figure 1:
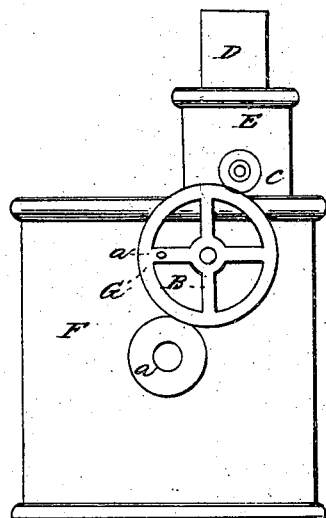
Figure 2:
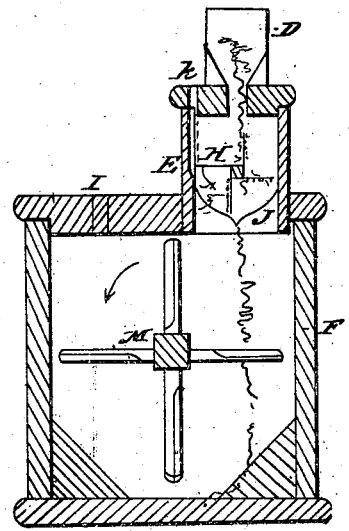
Figure 3:
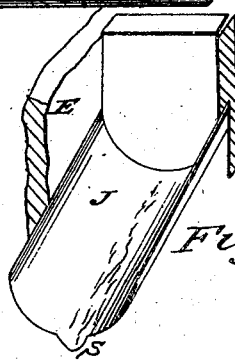
Figure 4:
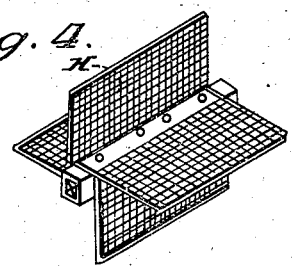

Figure 1 is an end elevation.
Figure 2 is a cross-section, showing the parts.
Figure 3 is a perspective view of the bottom of the beater-box E.
Figure 4, a perspective view of the perforated beater H.

a, fig. 1, represents the pinion to drive the lower dash M; B, fig. 1, represents the drive-wheel that gears into the pinions a and C, and gives motion to the parts; C, fig. 1, represents the pinion to drive the beater H; D represents the receptacle for cream; E represents the box that contains beater H; F represents the body of churn; G represents the handle to turn wheel B with; H represents the beater; J represents the bottom of the box that contains the beater; K represents an air-tube to let in fresh air; L represents an air-tube to allow circulation of pure, fresh air; M represents the lower dasher.

To enable others to make and use my invention, I will proceed to describe its construction and operation.

I construct the body of the churn F, the pinions a and C, and drive-wheel B, of any convenient size, and of any suitable material, in the ordinary manner, claiming no patent therefor. I construct the box containing the beater H of any suitable material, fixing the bottom as follows: Take a piece of tin or any other metal and fit it to the circle made by the revolving of the beater H. I swage or make a groove in this bottom, as shown at S, figs. 2 and 3. This groove commences at nothing at the farther end of beater-box, and increases to a sufficient depth to give an inclination sufficient to allow the cream to run down to the body of the churn; this discharges the cream at the end of the churn, so that the dashers will not fill or clog it up. I construct the beater H of any suitable material, but usually of wire cloth, with a rim of wire soldered to the edges of each float or fan to stiffen it; I put these fans on to the sides of the axle, as shown. I construct a small tube, K, and insert it in the cover of the beater-box, letting it run down to past the centre, housing it in the side of the beater-box, turning the lower end out a little, as indicated by arrow.

Now, the operation of my improvement is as follows: I put the cream into the receptacle D; then, by turning the wheel B, a rapid motion is given to the beater H, which whips or passes through the cream as it runs from the vessel D to the body of the churn, thereby breaking the sacks or little globules, which pass down to the bottom of churn, and are properly gathered by use of the dasher M. The introduction of fresh air into the cream while churning is quite a desideratum. To accomplish this I put in the tube K, and by the rapid motion of the beater H, and having the fans fitted as described, it acts like a suction-blast, and air is drawn down the tube and thorougly mixed with the cream. The pinion C is so fitted on the shaft that it can be put out of gear, thus allowing the working of the dasher M to gather the butter. Now, to cleanse this churn you have but to put in hot water and turn the wheel B, and all the parts are thoroughly cleansed, there being no screens or shields to hold dirt.

What I claim as my invention, and desire to secure by Letters Patent, is—

The perforated beater H, the air-tube K, and the grooved bottom J, when constructed, arranged, and operating substantially as and for the purposes above set forth.

WM. W. SANBORN.

Witnesses:
B. B. HART,
GEO. W. PARKER.